United States Patent
Constantine

(10) Patent No.: US 9,239,908 B1
(45) Date of Patent: Jan. 19, 2016

(54) MANAGING ORGANIZATION BASED SECURITY RISKS

(75) Inventor: Conrad P. Constantine, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/172,074

(22) Filed: Jun. 29, 2011

(51) Int. Cl.
  *G06F 11/00* (2006.01)
  *G06F 12/14* (2006.01)
  *G06F 12/16* (2006.01)
  *G06F 21/00* (2013.01)

(52) U.S. Cl.
  CPC ..................................... *G06F 21/00* (2013.01)

(58) Field of Classification Search
  CPC ............................... G06Q 10/06; G06Q 21/00
  USPC .......................................................... 726/25
  See application file for complete search history.

(56) References Cited

U.S. PATENT DOCUMENTS

| | | | |
|---|---|---|---|
| 2004/0225627 A1* | 11/2004 | Botros et al. ................... | 706/16 |
| 2008/0263547 A1* | 10/2008 | Saunier ......................... | 718/100 |
| 2009/0024663 A1* | 1/2009 | McGovern .................. | 707/104.1 |
| 2009/0144095 A1* | 6/2009 | Shahi et al. ....................... | 705/4 |
| 2009/0178142 A1* | 7/2009 | Lieblich et al. ................. | 726/25 |
| 2010/0199352 A1* | 8/2010 | Hill et al. ......................... | 726/25 |
| 2012/0096553 A1* | 4/2012 | Srivastava et al. .............. | 726/24 |
| 2012/0159647 A1* | 6/2012 | Sanin et al. ..................... | 726/28 |

OTHER PUBLICATIONS

Debbie Tesch; IT Project Risk Factors: The Project Management Professionals Perspective; Xavier University, Cincinnati, OH; pp. 1-10.*

* cited by examiner

*Primary Examiner* — Monjour Rahim
(74) *Attorney, Agent, or Firm* — Krishnendu Gupta; Jason A. Reyes

(57) ABSTRACT

A method and system is used in managing organization based security risks. Organization based information is analyzed for information that is suitable for use in attacking a user in the organization. The organization based information comprises user access information. Publicly available information is analyzed for information that is suitable for use in identifying the user within the organization. Based on the analyzes, there is derived a risk score for the user.

14 Claims, 2 Drawing Sheets

MANAGING ORGANIZATION BASED SECURITY RISKS

TECHNICAL FIELD

This invention relates to managing organization based security risks.

BACKGROUND OF THE INVENTION

Many computer users and other entities have systems that utilize some form of security. Therefore, there often arises a need to prevent all but selected authorized persons from being able to carry out some defined transaction or to gain access to electronic equipment or other system, facility or data. Preventing unauthorized clearance or access typically involves devices which limit access to the subject data, facility, or transaction to those who possess a unique physical device, such as a key or who know a fixed or predictable (hereinafter "fixed") secret code. In at least some cases, relying on a fixed code or unique physical device as the means to control such selective clearance or access can mean that would-be unauthorized users need only obtain possession of the fixed code or unique device to gain such clearance or access. Typical instances of fixed codes include card numbers, user numbers or passwords issued to customers of computer data retrieval services.

So-called phising or phishing attacks are a substantial threat for all kinds of transactions based on a secure and authenticated access to a server. Economically important types of transactions are so called e-banking, e-voting, e-healthcare and further electronic services. A phishing attack usually comprises the use of social engineering, to fool the user to exchange secret data, e.g. log-on data, with the attacker. The user undertaking such a log-on procedure believes he communicates and exchanges data with the correct provider. The attacker, a man-in-the-middle, uses the transmitted authentication data thereafter or simultaneously to affect a log-on procedure with the service provider under the identity of the attacked authorized user. Following the log-on procedure the attacker than misuses the user's rights. Within this meaning a phishing attack is a classical so called man-in-the-middle attack, which cannot be fend off easily through pure cryptographic measures. It may not be a very successful measure trying simply to elucidate the users because it is sufficient that only a very small portion of the users fall for such a social engineering mislead.

In phishing cases in which a specific user is targeted by name, it is known as "spear phishing". Upon receiving such a message, the user, believing it to have been sent from the recognized institution or provider, opens a link to a Web page as directed and enters a login name and password. The stolen information is then used to illegally obtain money (for example from a user's bank account) and/or to otherwise illegally obtain a financial or other advantage. Various solutions have been proposed in an attempt to block such illegal activity and the concomitant financial losses which arise. For example, U.S. patent application No. 2006/0174119 describes a method for storing the sensitive information of the user; however, the user must select the data to protect as the method does not operate automatically. Also the user sensitive data can be retrieved from the repository where it is stored, as it is not masked or blocked. The method also cannot handle complex web forms or sophisticated forms of fraud.

Other proposed solutions focus upon the link contained in the e-mail, comparing such links to a list of known or suspected phishing web sites; such solutions are provided by most known web browsers and toolbars nowadays. U.S. patent application No. 2005/0289148 describes a method for identifying suspected patterns in an email message that may indicate that the email is a spoof or phishing email, followed by warning the user about it. Access to the site is blocked or the user is warned that the web site is dangerous. Links may be analyzed when contained in an e-mail message or upon a request of the user to access a web site associated with the link.

Large enterprises are entities that have a significant reliance on an information technology (IT) infrastructure for their core business operations, and they have a corresponding significant investment in that infrastructure. They include public utilities; financial companies; transportation and logistics providers; local, state, and national governments; and global energy companies. They share the following characteristics, in varying degrees:

Dispersed or distributed operations. The diversity of their operations includes geographical and/or functional distribution. The IT infrastructure supporting the distributed operations is usually a combination of owned and leased. Responsibility for security and operations of the infrastructure is correspondingly distributed (shared).

Critical assets or operations that warrant protection. Large enterprises have significant assets of operations that warrant protection beyond what the industry generally considers "ordinary measures." The value of those assets may be assessed in dollars (financial networks and data), intellectual value ("intellectual property"), public necessity (utilities and critical infrastructure), and state/national security. Disruption of these critical assets or operations will generally yield cascading negative effects across a wide geopolitical and business landscape.

Full-time, 24×7 operations or the resources to accommodate them. Because of the distributed nature of the operation and the critical need to protect it, large enterprises can provide continuous monitoring and protection services. These may be routine coverage or surge capacity to meet a 24×7 requirement, and it may be a combination of indigenous and contracted capability. This framework proposes certain levels of investment in human capital that a smaller enterprise may find difficult to justify. Implementation of this framework within an enterprise also may not be optimal for an otherwise large enterprise that outsources critical protection functions, such as network monitoring, forensics and analysis, and incident response.

Some characteristics, not limited to large enterprises, are common to entities with a large user population and functional organization including:

Combined operations and security responsibilities. In this context, "operations" refers to the health and functioning of the IT infrastructure (network). Security refers to the protection measures associated with ensuring infrastructure and data availability, integrity, and authentication. Many organizations today levy the responsibility for security on the same IT staff tasked with ensuring the network operates effectively. Consequently, staffs must make decisions balancing security with ease of use (convenience) when it comes to operations of the network.

Range of user experience and skills. Larger enterprises are likely to have a broad range of familiarity and skill among its user population. This translates into potential trade-offs—sometimes significant ones—when it comes to implementing security policies and training programs. Also, depending on the enterprise, users include a mix of internal users and external customers (clients)—additionally compounding the skill/ experience variables, and possibly introducing attack vectors that favor sophisticated threats.

Varying levels of interest and involvement by leadership and management. In the context of network security/defense, this refers to how network-savvy and involved the leadership is in decision making. It also refers to the level at which they are involved—ranging from strategic decisions-only, to developing the necessary policies and personally directing response actions. These factors dictate the required levels of autonomy—and associated levels of trust—that an enterprise comfortably places upon its IT staff.

The cyber threat environment that today's large enterprises typically must navigate has changed rapidly over time. Running through each phase has been the constant threat that someone with access to the internal network—either witting or unwitting—can hold an enterprise hostage and create discord that is equal parts damaging and difficult to trace.

A recent phase in threat evolution is a more advanced, persistent threat. It is characterized by greater sophistication and skill, rapid collaboration, and increasingly structured relationships to overwhelm complex network security mechanisms—oftentimes from the inside. Their motivation is becoming increasingly profit-focused, and their modus operandi includes persistence and stealth. It includes possible state-sponsored actors whose effects contribute to long-term influence and exploitation campaigns, as well as devastating effects to facilitate military action. Their signatures include the use of zero-day exploits, distributed agent networks, advanced social engineering techniques such as spear phishing, and long-term data mining and exfiltration. Their flexibility and robust kitbag of tools and techniques makes the advanced threats particularly difficult to successfully defeat with today's technology-heavy network security focus.

SUMMARY OF THE INVENTION

A method and system is used in managing organization based security risks. Organization based information is analyzed for information that is suitable for use in attacking a user in the organization. The organization based information comprises user access information. Publicly available information is analyzed for information that is suitable for use in identifying the user within the organization. Based on the analyses, there is derived a risk score for the user.

DETAILED DESCRIPTION

Figure 1:
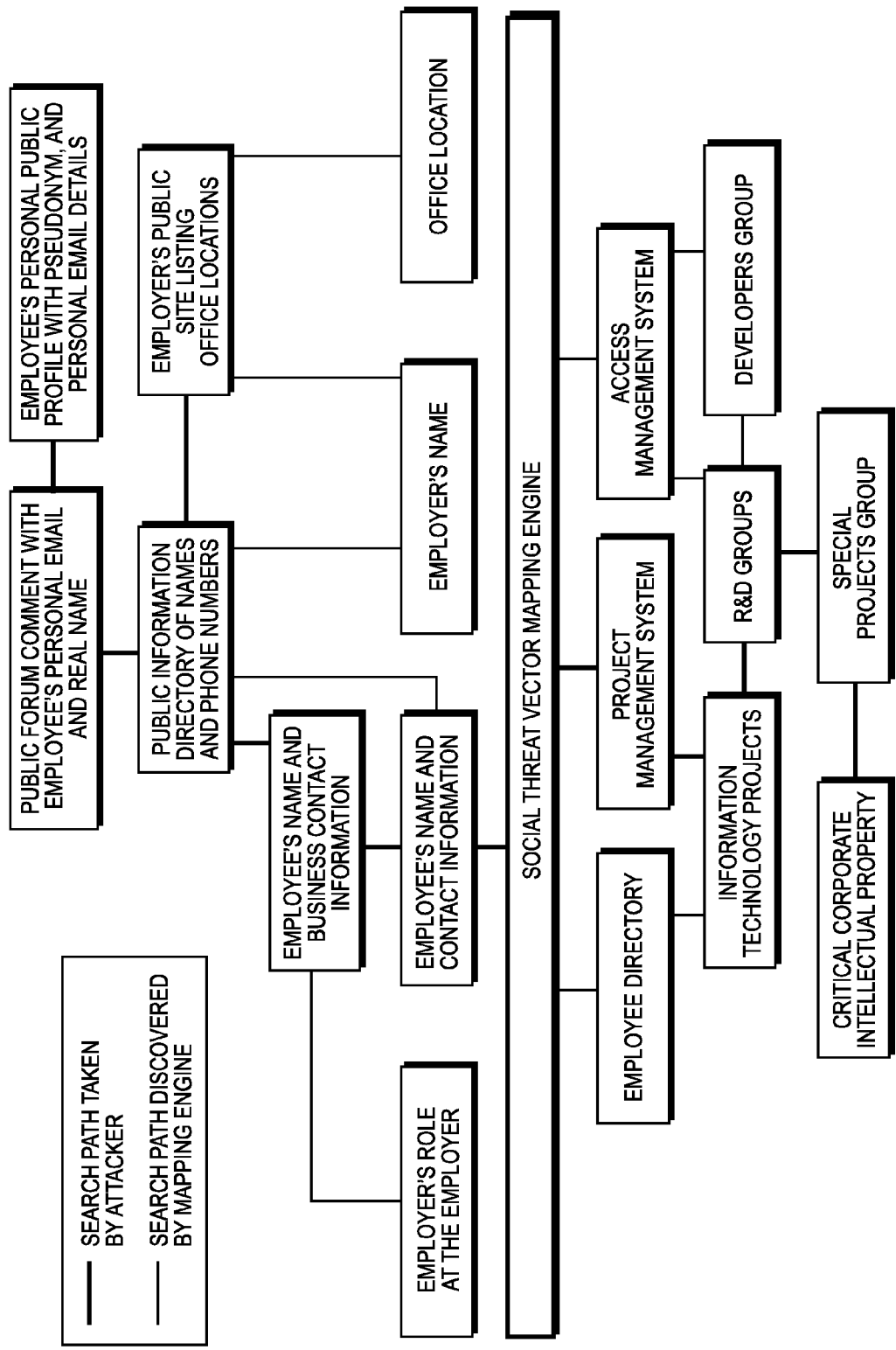
FIGS. 1-2 are examples of mapping that may be used with the technique described herein.

Described below is a technique for use in managing organization based security risks. In at least one implementation, the technique may be used to help with identifying and prioritizing potential high-risk/high impact targets of socially targeted malware. For example, in accordance with the technique, the risk and exposure presented to targeted usurpation of employee credentials in the criminal pursuit of access to intellectual property (e.g., company secrets) is collected and differentially calculated to prioritize monitoring activities for corporate information security response teams. Unlike a conventional approach which tries to locate attacks as they happen, at least one implementation of the technique described herein can help predict where the attacks are most likely to happen.

In particular, the usurpation of employee information assets by targeted attacks, driven from publicly-acquired knowledge of their corporate roles and contact information (e.g., using social engineering and spear-phishing) is a rapidly-expanding threat vector in the modern security world.

From the attacker's point of view, suitable targets for these attacks are often identified by investigating public social network and web contents to determine an employee's role and potential level of access to corporate assets, and by illegitimately obtained company directories to validate these findings. Victims are then targeted for social-engineering based attacks to obtain access credentials and unwittingly deploy malicious software within their employer's enterprise systems.

In at least one implementation in accordance with the technique, a method provides a process for answering two questions: "Who are the most at-risk employees to be targeted in this way?" and "Who are the employees, if successfully attacked in this manner, would provide an attacker with the path of least resistance to corporate intellectual property?". The results of these two questions are then cross-referenced with each other to product a risk-exposure score for employees to allow prioritized response for security incidents involving assets they utilize in the course of their job roles.

At least one implementation in accordance with the technique includes the following steps:

1) Corporate assets are prioritized according to criticality and impact of compromise to the enterprise.

2) Access to these assets is derived from corporate access management and project management systems, and is scored.

3) Multiple Internet searches for employees' names are performed, and the number of steps required to relate those searches back to their place of employment and job role is scored.

4) These two scores (access to critical assets, and the ease of researching an employee's access to these critical assets) are weighted and scored.

5) This final scoring is included in the weighted prioritization of incident response efforts to systems accessibly by these employees, factoring in the likelihood of targeted attacks.

Such implementation may include a software service that interacts with internal and external data sources, to perform the following:

a. Locating relational sets between internal asset and projects management systems.

b. Locating external public information that can relate publicly available information to an employee and his or her roles and responsibilities with an enterprise.

c. Correlating these two data sets and finding the least-cost-path between the internal and external endpoints in the relational matrix.

d. Scoring these paths based on shortness, and number of routes that cross these paths:

i. Determining how easy is it to make the relation between the external and internal endpoints.

ii. Determining how many possible ways this relation can be made.

Conventionally, with respect to an organization concerned with social engineering and/or spear phishing based attacks, the organization may consider additional monitoring for particular users, e.g., executives. However, executives may not really be the people who most need network defense. Executives may not have extraordinary or extensive network access, and may have access only to summarized versions of actual data, not raw financial data.

For example, it may be more important to determine, from among 50,000 employees, which employees are the 500 most dangerous/at risk people in the enterprise. In particular, it can be key to determine which employees are the easiest to locate from an external perspective, and if their access is leveraged, which employees would have the most benefit to an external attacker. And once such 500 employees are identified in a list, it can be important to avoid letting the list become out of date, since the organization changes day to day, so the list is updated programmatically in a specific implementation.

Conventionally, software is available to help do data mining with respect to people's public profiles and identities, and to find a person's online pseudonym with pictures. This may be accomplished with online search engines and detective skills, and within a couple of hours a real identity and location can be determined, and such conventional software can assist doing that in a formalized manner. An outsider attacker can determine a large amount about whom to target inside an organization or enterprise when people list their job roles as security administrators on their social networking pages.

An implementation in accordance with the technique described herein can identify a likely target quickly by processing everyone programmatically for security administrator roles, name, company name, and by cross referencing to the organization's or enterprise's own internal asset and project management systems. Results produced by the implementation can link a person to security administration and directly determine a low cost attack vector, i.e., a path to identifying a person with credentials on the inside who is also very easy to identify from the outside, and is therefore potentially very useful to a potential attacker.

In at least some cases, such an implementation may rely on networking principles, particularly the least cost path between two points. Each hop of the path may rely on word association, e.g., company name, security administrator, division name, and a determination can be made as to a minimum number of connections needed, through internal information systems, external search engines, social networking sites, and public registries.

Such an implementation programmatically determines a risk score between the outside world and critical systems in the form of people, anonymizes how this risk score was determined, and produce the single score, and updates this information on an ongoing basis. When a security event does occur that references a person with a high risk score, this provides an indication that this security event has importance beyond simply this particular person.

In at least some cases, careful implementation is important so that the technique which can be powerful for enterprise security defense is not abusable for other than intended purposes.

In at least one implementation, a result is produced simply from determining the least number of hops required to identify the most effective targets of the enterprise from external information. Internal systems are referenced to map the number of hops internally.

For example, it may be determined that an external attacker can find a user who lacks a great deal of access, but who is in a group with other users who do have such access, and who may be targeted by an attacker pretending to be the user who lacks the access. An implementation based on the technique can preemptively identify potential methods of social engineering into the enterprise, by determining what people can figure out from the outside, and who are the people on the inside who would be most useful to an attacker.

In an example described below, a young new hire is transferred to new group, is given a lot more access, and immediately updates a social networking page to brag about having been given access to a prestigious secret project. An implementation can identify such new hire as a highly valuable attack target, since the new hire is young, likely naïve, and has been granted a lot more access. This new hire is also not someone who would likely be identified through conventional auditing as a manual process within the enterprise, which auditing usually focuses on people that are perceived as the most important targets first, whereas real world attacks often happen in the reverse.

The implementation relies on access to or information from internal systems to determine who has access to what, keeps a database of that determination and makes a resulting score, and also makes use of external resources to survey and to process to determine a person's position, which is also kept in the database and processed for a score.

In at least some cases, the implementation maps one relational pivot to the next, to generate a large tree of connections external to the enterprise, another large tree of connections internal to the enterprise, and looks for which path between the easiest way on the outside to something valuable on the inside is the shortest path.

For example, if a person is a security administrator for an enterprise, and therefore has a zero cost path, that is likely who an attacker will target to get access to authentication systems, especially if the person has self-identified in public, so that there is a zero cost path to go from external discovery to targeting the person who has the access the attacker needs.

In another example, one step removed is a person who is a generalist in an IT security department of an enterprise, which does not give the attacker direct access to the security administrator, but the generalist can be asked who the security administrator is, which is only one step away. The attacker can attack the generalist, and then once the attacker is inside the enterprise, can determine the identity of the security administrator.

Thus, generally, a focus of the implementation is to determine how many steps are involved to reaching the attacker's goal.

In one or more advanced implementations, each step may also be weighted for difficulty and/or sophistication of the user, which may affect scores and ranking of priority of users for increased vigilance.

In at least some cases, depending on the implementation, if someone has a lot of access but is anonymous to the outside world, a score would reflect not much of a risk, and the same is true for someone who is well known but lacks much access.

An example implementation may be based on software that helps with search and data pivots, so that, given a name or an email address, or other bits of data, searches are performed, e.g., to map such data together and pivot out and find more information that is related. Such software helps speed up detective work on people, and gives such work a software framework for executing in a procedural manner. The example implementation makes use of additional data scraper sets, to make the software go through the enterprise's own active directory and project management systems, and then analysis software reviews results and calculates a shortest path and a least cost path. To keep results up to date as things change, processing of all users is continuous to provide real time scores so that when security events occur, a system can identify certain users as high risk targets for being the subject of social engineering, and other resources can review such users' situations first, which increases the chances of catching sophisticated attacks as they happen.

In the example, as now described in more detail, a recently-graduated programmer has taken his first job at a major corporation. He starts out by working on a low-level project in one department, and is granted minimal access to IT resources and proprietary information within that working group. After six months, his employers are impressed enough with his performance that he is transferred onto a new project that is in the research phase, and is not public knowledge even within the company. He is excited about the development, and posts on his public social media profile of the new development in his career. An implementation based on the technique described herein processes his profile, and scores his risk factor based on the following. He has access to multiple projects in the project management system. He has access rights across multiple groups that are not interdependent. His public social networking profiles identify him as working for his employer, via a series of relational pivots:

i. Public Profile #1 identifies him:
        1. As a developer
        2. On non-public projects
        3. Who has recently changed departments.
        4. It does not identify his employer, and lists only public personal information.
    ii. Public profile #2:
        1. Contains both his personal information, and information about his place of employment.

With this information, an attacker can now infer with some accuracy only from public information, the employee's roles and potential level of access to sensitive proprietary information within the target organization. He is identified as a high-exposure target to high-impact at-risk system for proprietary information theft.

Several weeks later, unusual connections from his workstation to critical systems are identified by security monitoring systems. Due to the employees role and access, these events are only slightly outside the realm of "normal conditions". Conventionally, the prioritization for investigating these events naturally falls very low on the task queue for events to investigate. By contrast, based on the technique described herein, the employee's exposure/risk score for targeted attacks is now factored into the prioritization system, which causes this event to rise to the highest percentile of the investigation queue.

The event is investigated, and a targeted attack with the goal of stealing corporate proprietary information is detected in its early stages, is mitigated, and the threat vector is removed before a serious breach can occur.

Figure 2:
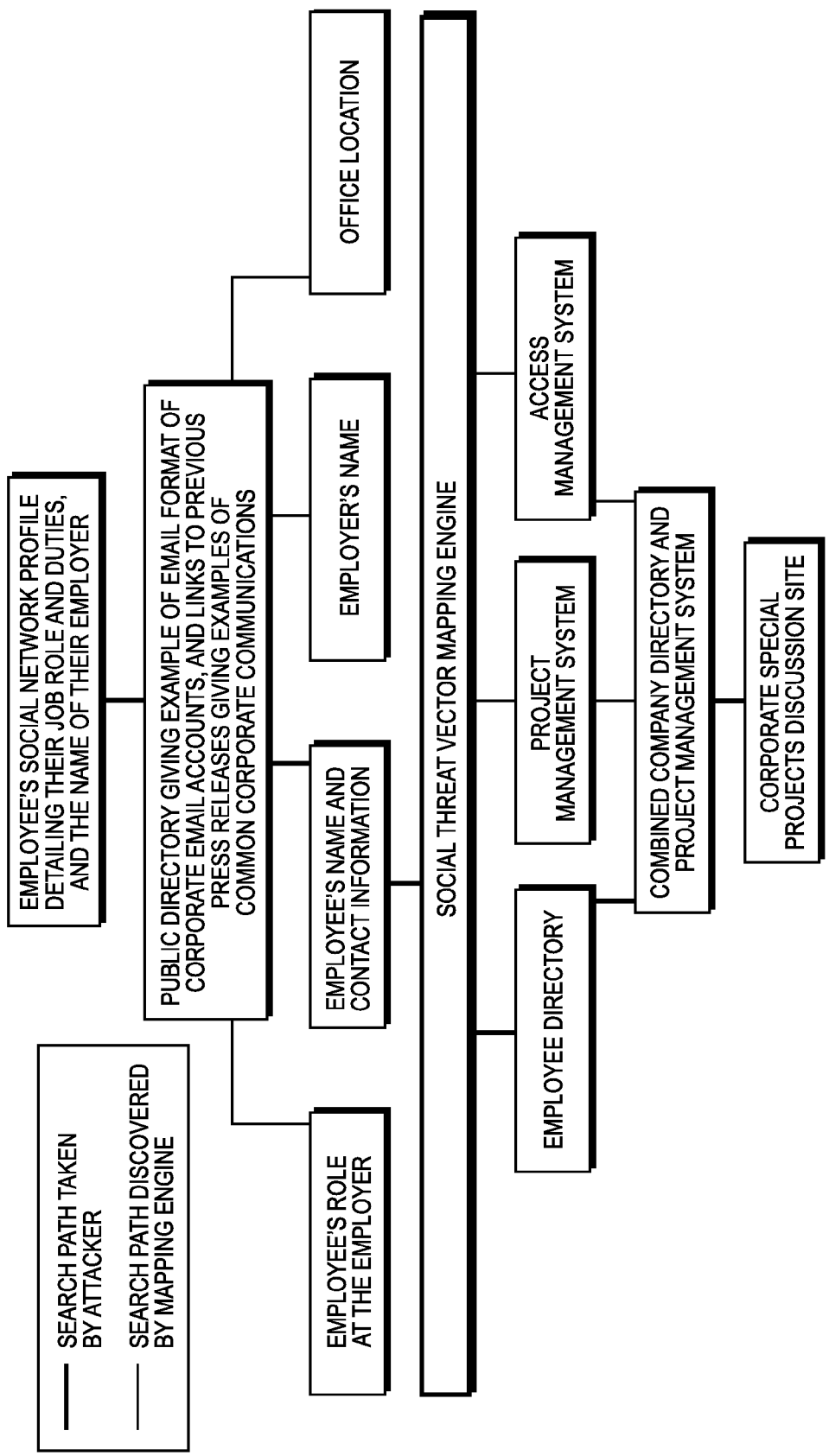

FIGS. 1 and 2 illustrate example of scenarios in which implementations of the technique may be used.

In the example of FIG. 1, which illustrates automated mapping of social threat vector risk calculation for a low-exposure use case, multiple levels of informational pivoting are required to obtain the required knowledge about the target. The attacker must research and correlate many large data sets to prove a viable attack path. Since each box of information also produces many other paths of correlation, accuracy of the attacker's enumeration of the target is not guaranteed, nor easy. This person (and their enterprise information management systems in unison) presents a difficult attacker vector.

In the example of FIG. 2, which illustrates automated mapping of social threat vector risk calculation for a high-exposure use case, most of the information the attacker requires is presented to them directly; they do not need to cross-reference large quantities of data to pivot a successful attacker path, success is almost guaranteed, and made easy for the attacker. This person (and their enterprise information management systems in unison) presents an extremely easy attacker vector.

Logic implementing one or more aspects of the technique can take various forms in various embodiments, provided that logic performs the functions required for producing scores as described herein. Such logic can be implemented in packages having a wide variety of shapes and form factors. For example, such logic can be, include, or be included in a desktop computer, laptop computer, or personal digital assistant (PDA). For example, such logic can be implemented as a general-purpose computer running a software program that possibly interacts with one or more other computer programs or devices on the same or a different computer or device. For example, such logic may include a web-browser with a plug-in software component. In still further embodiments such logic can be a cellular telephone, or a cellular telephone with specialized embedded hardware adapted to interact with the cellular telephone's circuitry. Other sizes, shapes, and implementations are possible without departing from the spirit of the invention.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The invention claimed is:

1. A computer-implemented method for use in predicting potential targets of attacks, wherein the potential targets are associated with an organization, comprising the steps:
    determining, from organization based information, a potential targets access to an asset of the organization;
    performing a search of publicly available information for information relating to the potential target, wherein the performed search identifies a name of the organization and the potential targets role within the organization; and
    based on the potential targets access and the potential targets role, determining a risk score for the potential target which reflects the ease of relating the potential target with the asset of the organization, wherein the risk score is dependent on the number of steps required to identify the name of the organization and the potential targets role within the organization;
    wherein the method steps are performed by a hardware processing device.

2. The method as claimed in claim 1, further comprising: based on the potential targets access to the asset, determining a first risk score such that the score reflects the risk in connection with potential targets access to the asset.

3. The method as claimed in claim 2, wherein the determining the first risk score comprises weighting the score in accordance with the importance of the asset to the organization.

4. The method as claimed in claim 3, wherein performing the search comprises investigating public social network and web contents for information identifying the potential target.

5. The method as claimed in claim 4, wherein performing the search comprises investigating public social network and web contents for information relating to the potential targets role within the organization.

6. The method as claimed in claim 5, further comprising: based on identifying the name of the organization and the potential targets role within the organization, determining a second risk score such that the score reflects the ease of relating the organization, the potential target and the role of the potential target.

7. The method as claimed in claim 6, wherein determining the risk score comprises correlating the first and second risk scores such that the derived risk score reflects the ease of relating the potential target and the role and the access to the asset.

8. A system for use in predicting potential targets of attacks, wherein the potential targets are associated with an organization, comprising:
- a hardware processing device;
- the system configured to:
  - determining, from organization based information, a potential targets access to an asset of the organization;
  - performing a search of publicly available information for information relating to the potential target, wherein the performed search identifies a name of the organization and the potential targets role within the organization; and
  - based on the potential targets access and the potential targets role, determining a risk score for the potential target which reflects the ease of relating the potential target with the asset of the organization, wherein the risk score is dependent on the number of steps required to identify the name of the organization and the potential targets role within the organization.

9. The system as claimed in claim 8, wherein the system is further configured to:
- based on the potential targets access to the asset, determining a first risk score such that the score reflects the risk in connection with potential targets access to the asset.

10. The system as claimed in claim 9, wherein the determining the first risk score comprises weighting the score in accordance with the importance of the asset to the organization.

11. The system as claimed in claim 10, wherein performing the search comprises investigating public social network and web contents for information identifying the potential target.

12. The system as claimed in claim 11, wherein performing the search comprises investigating public social network and web contents for information relating to the potential targets role within the organization.

13. The system as claimed in claim 12, wherein the system is further configured to:
- based on identifying the name of the organization and the potential targets role within the organization, determining a second risk score such that the score reflects the ease of relating the organization, the potential target and the role of the potential target.

14. The system as claimed in claim 13, wherein determining the risk score comprises correlating the first and second risk scores such that the derived risk score reflects the ease of relating the potential target and the role and the access to the asset.

* * * * *